US006831776B2

(12) United States Patent
Bonfrate et al.

(10) Patent No.: US 6,831,776 B2
(45) Date of Patent: Dec. 14, 2004

(54) PERIODIC THERMAL POLING OF WAVEGUIDES FOR QUASI PHASE MATCHING

(75) Inventors: Gabriele Bonfrate, Hampshire (GB); Petr Georgevich Kazansky, Hampshire (GB); Valerio Pruneri, Southampton (GB)

(73) Assignee: University of Southampton, Hampshire (GB)

( * ) Notice: Subject to any disclaimer, the term of this patent is extended or adjusted under 35 U.S.C. 154(b) by 254 days.

(21) Appl. No.: 10/051,153

(22) Filed: Jan. 22, 2002

(65) Prior Publication Data

US 2002/0114059 A1 Aug. 22, 2002

Related U.S. Application Data

(63) Continuation of application No. PCT/GB00/02829, filed on Jul. 21, 2000.

(30) Foreign Application Priority Data

Jul. 21, 1999 (GB) .............................................. 9917138

(51) Int. Cl.[7] .............................................. G02F 1/365
(52) U.S. Cl. ...................................... 359/332; 385/122
(58) Field of Search ................................. 359/326–332; 385/122, 123

(56) References Cited

U.S. PATENT DOCUMENTS

| | | | | |
|---|---|---|---|---|
| 5,028,107 A | * | 7/1991 | Bierlein et al. | 359/328 |
| 5,617,499 A | | 4/1997 | Brueck et al. | 385/122 |
| 5,654,229 A | * | 8/1997 | Leplingard et al. | 117/56 |
| 5,734,772 A | * | 3/1998 | Gopalan et al. | 385/122 |
| 5,748,361 A | * | 5/1998 | Gupta et al. | 359/332 |
| 5,875,053 A | | 2/1999 | Webjorn et al. | 359/326 |
| 6,044,190 A | * | 3/2000 | Kashyap | 385/123 |
| 6,215,576 B1 | * | 4/2001 | Minemoto et al. | 359/245 |

FOREIGN PATENT DOCUMENTS

EP    0 981 067 A2    2/2000

OTHER PUBLICATIONS

Reich et al.; "Electrode Geometries for Periodic Poling of Ferrolelectric Materials"; Optics Letters, Optical Society of America, vol. 23, No. 23, pp. 1817–1819, (Dec. 1,1998).

Armstrong et al. ; "Interactions Between Light Waves in a Nonlinear Dielectric"; Physical review, vol. 127, No. 6, pp. 1918–1939, (Sep. 1962).

Myers et al.; "Large Second–Order Nonlinearity in Poled Fused Silica", Optics Letters, vol. 16, No. 22, pp. 1732–1734, (Nov. 1991).

Kashyap; "Phase–Matched Periodic Electric–Field–Induced Second–Harmonic Generation in Optical Fibers", J. Opt. Soc. Am. B, Optical Society of America, vol. 6, No. 3, pp. 313–328, (Mar. 1989).

(List continued on next page.)

Primary Examiner—John D. Lee
(74) Attorney, Agent, or Firm—Finnegan, Henderson, Farabow, Garrett & Dunner, L.L.P.

(57) ABSTRACT

A method of creating a varying second order non-linearity profile along a waveguide, comprising: providing a waveguide structure with a waveguiding core and a surface adjacent to the waveguiding core; structuring the surface to produce a structured surface defining a varying distance between the structured surface and the waveguiding core along the waveguide; and thermally poling the waveguide structure to generate a varying second order non-linearity profile along the waveguide-derived from the varying distance between the structured surface and the waveguiding core. By the surface structuring the modulation of the second order non-linearly induced by the thermal poling can be enhanced. The waveguide structures can be used for making a variety of quasi-phase-matched (QPM) devices.

28 Claims, 13 Drawing Sheets

OTHER PUBLICATIONS

Kashyap et al.; "Phase–Matched Second–Harmonic Generation by Periodic Poling of Fused Silica", Appl. Phys. Lett., vol. 64, No. 11, pp. 1332–1334, (Mar. 1994).

Kasansky et al., "Blue–Light Generation by Quasi–Phase–Matched Frequency Doubling in Thermally Poled Optical Fibers"; Optical Society of America, Optics Letters, vol. 20, No. 8, pp. 843–845, (Apr. 1995).

Pruneri et al.; "Frequency Doubling of Picosecond Pulses in Periodically Poled D–Shaped Silica Fibre", Electronics Letters, vol. 33, No. 4, pp. 318–319, (Feb. 1997).

Pruneri et al.; "Efficient Frequency Doubling of 1.5 $\mu$m Femtosecond Laser Pulses in Quasi–Phase–Matched Optical Fibers"; Applied Phys. Lett., vol. 72, No. 9, pp. 1007–1009, (Mar. 1998).

Pruneri et al.; "Greater Than 20%–Efficient Frequency Doubling of 1532–NM Nanosecond Pulses in Quasi–Phase–Matched Germanosilicate Optical Fibers"; Optical Society of America, Optics Letters, vol. 24, No. 4, pp. 208–210, (Feb. 1999).

Scalora et al.; "Pulsed Second–Harmonic Generation in Nonlinear, One–Dimensional, Periodic Structures"; The American Physical Society, Physical Review A, vol. 56, No. 4, pp. 3166–3175, (Oct. 1997).

Pruneri et al.; "Thermal Poling of Silica in Air and Under Vacuum: The Influence of Charge Transport on Second Harmonic Generation"; American Institute of Physics, Applied Physics Letters, vol. 74, No. 17, pp. 2423–2425, (Apr. 1999).

\* cited by examiner

PERIODIC THERMAL POLING OF WAVEGUIDES FOR QUASI PHASE MATCHING

This is a continuation of PCT International Application No. PCT/GB00/02829 filed Jul. 21, 2000.

BACKGROUND OF THE INVENTION

The present invention relates to methods and apparatus for inducing a varying second-order non-linearity profile in optical fibres and other waveguides, and to waveguides having such a varying second-order non-linearity profile.

Waveguides with periodically varying second-order non-linearities are of interest, since they can be used to provide quasi-phase matching (QPM). In non-linear glasses, QPM is usually achieved by periodically alternating regions with non-linearity (poled sections) and regions without non-linearity (unpoled sections). In this way the phase-mismatch accumulated in each poled section is reset in the unpoled one (where the absence of the non-linearity prevents back conversion), so that in the next poled section the fields have the right phase relation for constructive growth of the generated signals.

QPM devices have potential applications for optically integrated frequency conversion of coherent light sources, wavelength routing in telecommunication systems, all-optical switching via cascading of second-order non-linearities, parametric fluorescence for quantum applications (such as cryptography and metrology), and high speed modulation.

Since its proposal [1] QPM has been implemented in many materials including lithium niobate, semiconductors and polymers. Several configurations have been employed to achieve efficient second-order non-linear optical interactions. QPM allows one to access new wavelengths and to provide higher efficiency and non-critical interaction geometries. QPM also provides flexibility and new possibilities for phase-matching, especially in materials where the birefringence is not high enough to compensate for the dispersion and where modal phase-matching is not desirable in order to avoid the generation of light in higher order modes.

QPM devices can be fabricated by periodic poling of waveguides. Here and throughout this document the term "periodic poling" is used to mean a varying second-order non-linearity profile, not necessarily of a single frequency. Periodic poling exploits the potential of the QPM technology to extend the possibility of efficient frequency conversion to materials which are in widespread use in optical applications, such as silica and germanosilicate optical glass. This is advantageous since silica and some other optical glasses exhibit high transparency, are low cost, have high optical damage thresholds, and are straightforward to integrate with optical fibre and planar waveguide-based systems.

Considering all the aforesaid properties, it is natural to consider periodically poled silica fibre (PPSF) and periodically poled silica waveguides (PPSW) as ideal media for a wide range of QPM processes, such as frequency conversion of fibre lasers, difference frequency generation for routing at telecommunication wavelengths, generation of correlated photon pairs via parametric fluorescence for quantum cryptography and avalanche photodiodes characterisation, and cascading of second-order non-linearities to produce equivalent third order effects (self and cross-phase modulation) for all-optical switching. In addition to the above applications which are based on three-wave-mixing (TWM) processes, periodic modulation of a second order non-linearity (hence the electro-optic coefficient) could be exploited to produce high speed travelling wave electro-optic switches.

Compared to more traditional crystal waveguides, PPSF has the drawback of a lower effective non-linear coefficient ($d_{eff}$), but offers the advantages of: (i) a longer interaction length (L) for the same bandwidth (due to a lower dispersion); (ii) higher damage intensity threshold (I); and (iii) lower loss ($\alpha$) and refractive index (n), thus keeping high values for the efficiency-factor ($d_{eff}^2 L^2 I/(\alpha n^3)$). In particular, the large value of the bandwidth-interaction length product makes PPSF suitable for frequency conversion of short pulses (picosecond and even femtosecond) where low group velocity mismatch between interacting pulses at different frequencies is desirable.

Production of a permanent and large second-order non-linearity in fused silica glass was demonstrated some time ago [2]. However, later initial work on QPM in optical fibres [3] relied on a different process which produced a non-permanent second-order non-linearity. Later work on QPM [4] is based on a permanent and large second-order non-linearity induced in fused silica by a combined thermal and electrical process in which a high voltage is applied between electrodes across a waveguide while the waveguide is maintained at a relatively high temperature. This process which involves elevated temperature is referred to, at least in the present document, as thermal poling. By structuring one of the electrodes, the thermal poling can be selectively induced only in those regions of the waveguide underlying the structured electrode. In this way a varying profile of the second order non-linearity can be induced. This is referred to as periodic thermal poling (PTP), at least in the present document, where it shall be understood that the term "periodic" does not imply that the second order non-linearity profile is necessarily of a single frequency component. More complex profiles are also to be understood to be encompassed by this term.

PTP has been demonstrated in silicate glass bulk [5] and in optical fibre [6] to produce permanently poled structures. The use of planar lithography on a D-shaped fibre to define a patterned electrode for PTP has also been demonstrated [7] and subsequently used for highly-efficient frequency-doubling of femtosecond pulses [8], for high power fibre sources [9], and for parametric fluorescence experiments. A technique for planar lithography has been described [10] and the use of such technique to define periodic structure was suggested, however not supported by any experimental data.

The typical QPM periods for forward three-wave mixing (i.e. the three interacting waves are propagating in the same direction) in glass-based optical fibres and planar waveguides are between 10 and 100 $\mu$m. However for backward interaction (one of the waves is propagating in the opposite direction with respect to the other two waves) periods in the range of 0.3–1 $\mu$m are desirable.

Another interesting feature of glass is the possibility of combining linear refractive index and second-order non-linear gratings in the same fibre or planar waveguide device. This offers the possibility of making, for example, a fibre-based fully-integrated optical parametric oscillator where mirror feed-back is provided by a linear Bragg grating and a second-order non-linear grating provides a gain medium. The combination of linear and non-linear grating could also lead to enhanced efficiency [11].

SUMMARY OF THE INVENTION

According to one aspect of the invention there is provided a method of creating a varying second order non-linearity profile along a waveguide, comprising: providing a waveguide structure with a waveguiding core and a surface adjacent to the waveguiding core; structuring the surface to produce a structured surface defining a varying distance between the structured surface and the waveguiding core along the waveguide; and thermally poling the waveguide structure to generate a varying second order non-linearity profile along the waveguide derived from the varying distance between the structured surface and the waveguiding core.

By the surface structuring the modulation of the second order non-linearity induced by PTP can be enhanced.

The thermal poling preferably also comprises: forming a first electrode on the structured surface and arranging a second electrode so that the waveguiding core lies between the first and second electrodes; and applying a voltage between the first and second electrodes while maintaining the waveguide structure at an elevated temperature.

Owing to the surface structuring, the first electrode can be made continuous along the structured surface of the waveguide structure and does not necessarily need to have a patterned structure to generate a periodic poling of the second order non-linearity.

The second electrode is advantageously embedded within the waveguiding structure. This can be achieved by fabricating the waveguide with a hole and inserting a metal wire therein for the electrode.

In the following, a novel fabrication technique to achieve PTP in D-shaped fibres is described in detail.

Periodic etching before metal electrode deposition to improve the non-linear modulation.

Rounded corners are used in the periodic electrode structure to significantly reduce the occurrence of electrical breakdown and consequently electrode damage, during PTP.

In the following detailed description, waveguide geometry considerations are discussed in detail. For example, the importance of the distance between electrodes during thermal poling is discussed in the light of the mechanism of depletion region formation and the measurements on fused silica bulk samples.

It is also described how a large fibre diameter and/or fibre with an internal hole can be advantageously used to avoid electrical breakdown during PTP.

The varying second-order non-linearity profiles realisable with embodiments of the invention can be used to fabricate various devices. In the case of three wave mining processes, the profile allows compensation of the phase-mismatch between the interacting waves and the corresponding non-linear driving polarisation (i.e. QPM). A waveguide structure and poling conditions are used which maximise the overlap between the interacting waves and the poled region, the efficiency of the interaction being proportional to the degree of overlap.

In an illustrative embodiment of the invention periodically poled D-shaped germanosilicate fibres are fabricated using surface structured PTP. The use of uniform pre-etching is also discussed for preparing the sample surface prior to further etching the surface to create the surface structuring. The results of three wave mixing experiments (including frequency doubling and parametric fluorescence) carried out using the fabricated samples are then presented.

Other novel aspects and advantages of the present invention may become apparent upon reading the following illustrative description and upon reference to the drawings.

DETAILED DESCRIPTION

A first embodiment of the invention relates to a fabrication method developed for PTP of D-shaped germanosilicate optical fibres.

For the first embodiment, the wavelength of interest is 1.5 $\mu$m, and the non-linear process considered is forward three-wave mixing. Poling periods ranging between about 10 to 100 $\mu$m are therefore needed.

The method of the first embodiment starts from a D-shaped germanosilicate fibre with numerical aperture of ~0.19, core diameter of ~6 μm, outer diameter of ~300 μm and initial flat surface/core distance of 13 μm. The outer diameter is about twice that of common fibres, thus allowing better photolithographic processing and lower breakdown probability during thermal poling.

Figure 1:
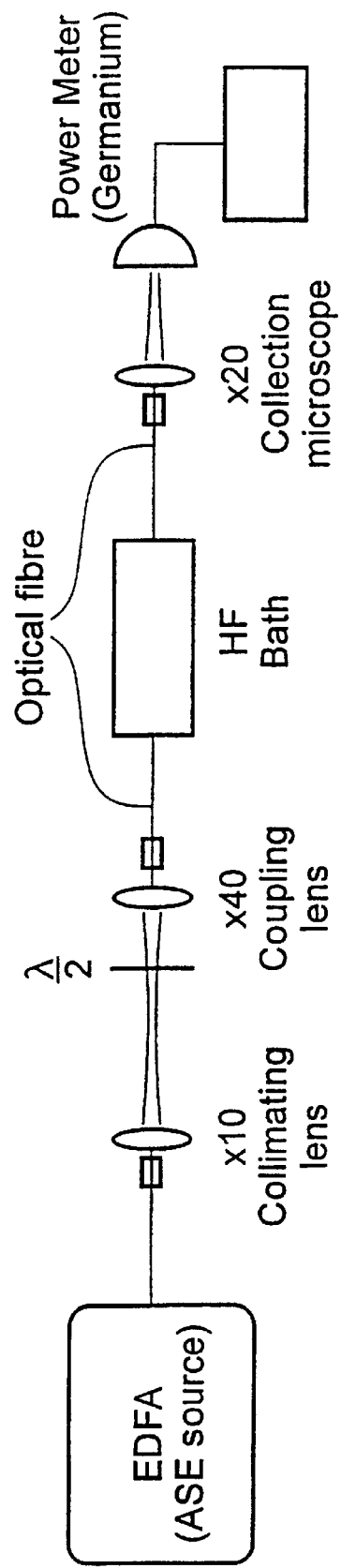
FIG. 1 Set-up for in-situ measurement of transmission loss during uniform etching of D-shaped fibre.

The D-shaped fibre was preliminary etched uniformly using the apparatus sketched in FIG. 1 which allows to control in real time the transmission at around 1.5 μm while the fibre is placed in a HF buffered solution (etching rate of ~0.1 μm/min).

Figure 2:
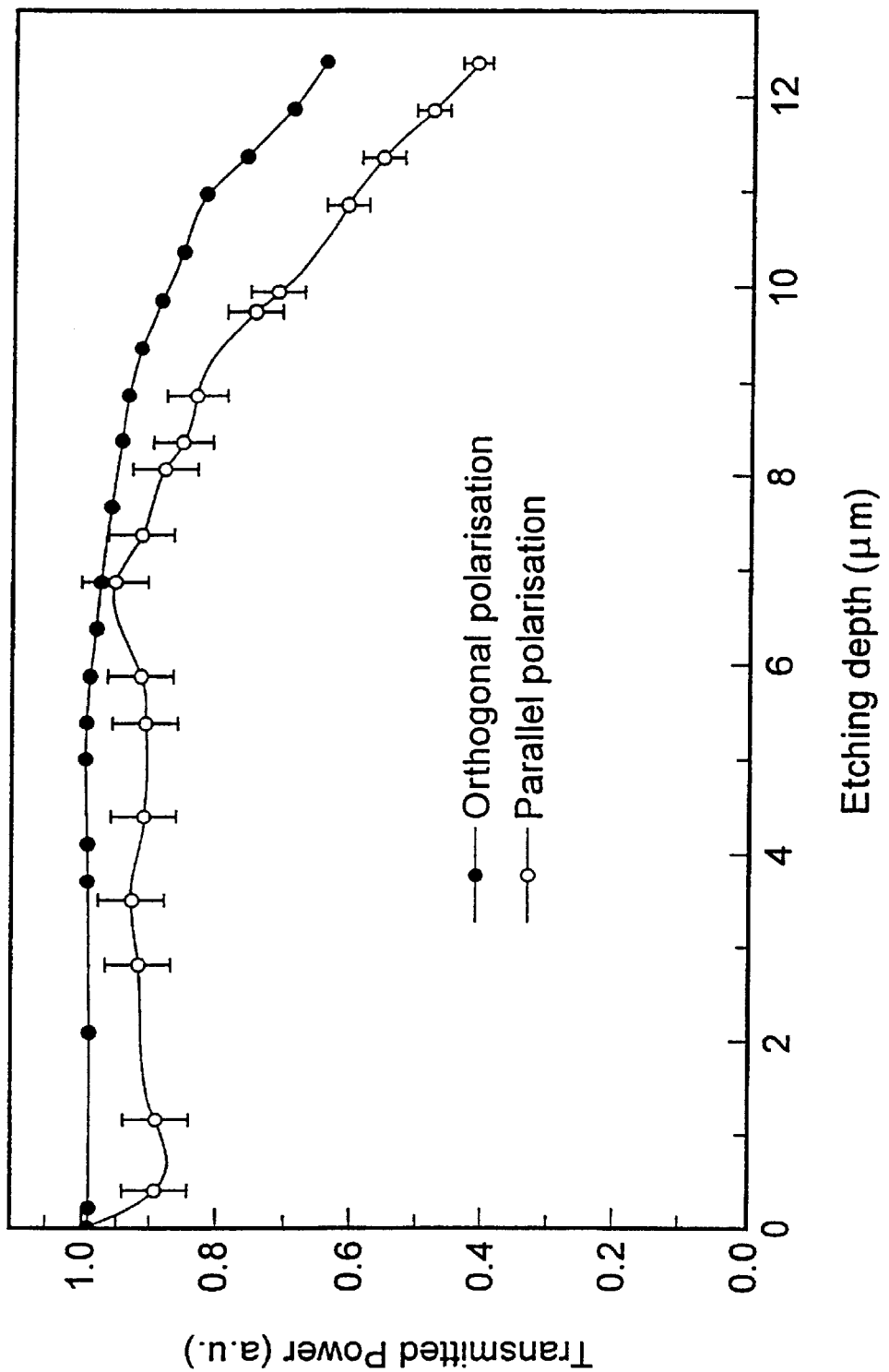
FIG. 2 Power transmission at 1.5 $\mu$m against etching depth.

FIG. 2 shows the transmission of the fibre against the etching depth. The etching is stopped when the transmission starts decreasing, so that the flat surface/core distance is about 10 μm. This distance is, on the one hand, sufficiently small that the core region is within range of the subsequent thermal poling induced by a surface electrode, while, on the other hand, sufficiently large to avoid significantly increased optical propagation losses in the waveguide.

Figure 3:
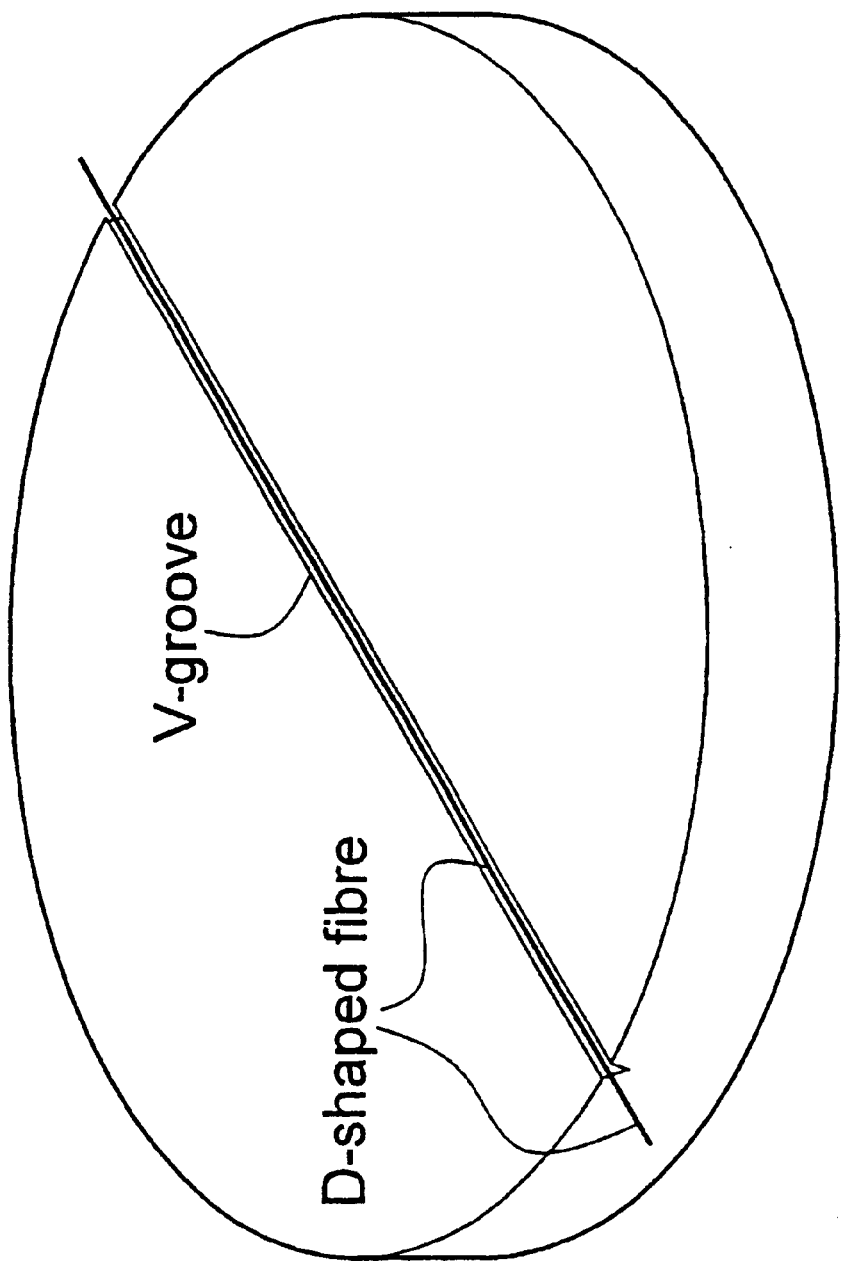
FIG. 3 D-shaped fibre sample positioned in a V-groove in preparation for planar lithographic processing.

FIG. 3 shows the next step of the method. Namely, after uniform etching and cleaning, the fibre is placed on a metal substrate with V-groove and taped at the ends (or alternatively glued) for standard planar lithography to define a structured surface and subsequently deposit a metal electrode to use as anode for PTP.

Figure 4B:
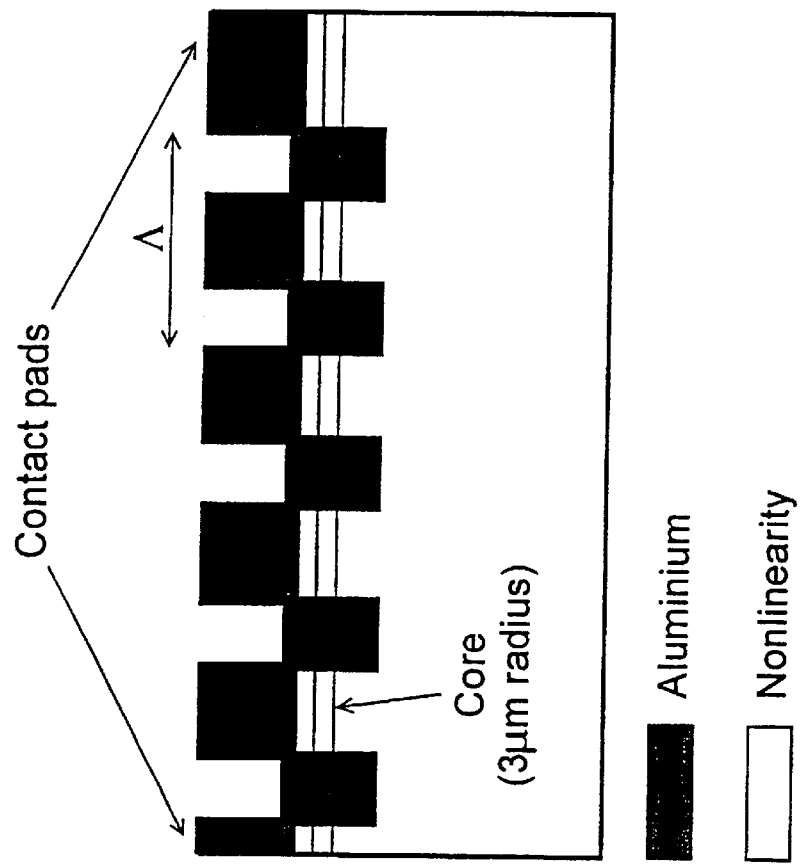
FIG. 4B Longitudinal section of D-fibre of FIG. 4A showing Al patterning and regions of thermally poled non-linearity (shaded).
Figure 4A:
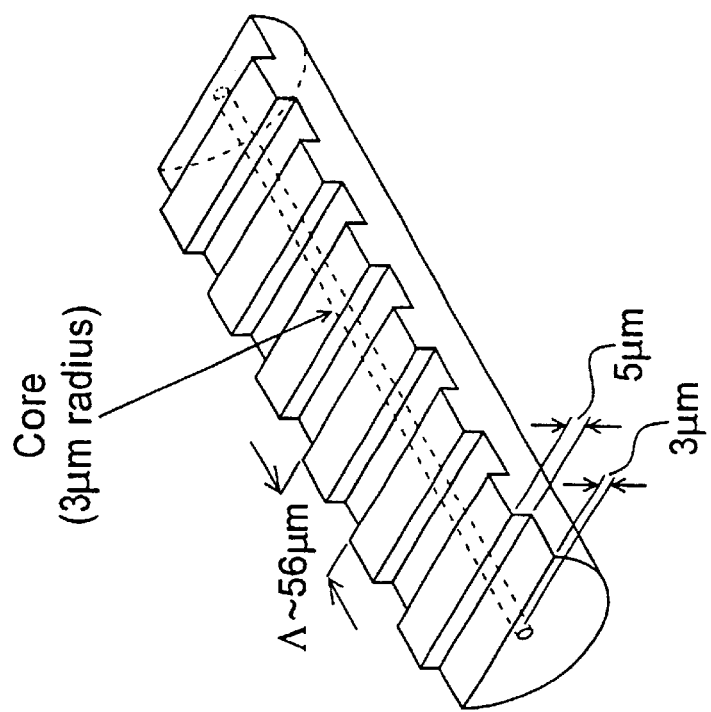
FIG. 4A Perspective view of D-fibre after periodic etching and Al patterning.

FIG. 4A and FIG. 4B show the next steps of the method. Namely, instead of direct patterning of an anode electrode after the uniform etching, another technique is used in which the surface is structured with the idea of improving the modulation of the second order non-linearity. Preliminary uniform etching reduces the flat surface/core distance to ~10 μm, as mentioned above. A photoresist pattern is then deposited on the plane face of the D-fibre and periodic etching in a HF buffered solution is performed. The region not covered by the resist is etched away by about 5 μm. Subsequently, Al was evaporated and finally the resist removed.

FIG. 4A and FIG. 4B show the results of this process. The geometry (including the mark-to-space ratio) of the initial resist pattern has to take account of the fact that the etching is fairly isotropic, so that material is removed under the resist itself, thus altering the mark to space ratio of the structure. (Alternatively, anisotropic etching may be considered to avoid this additional factor). The Al lines are connected by a lateral longitudinal back-bone electrode, which ensures electrical contact along the whole length (see FIG. 4B).

Conventionally, modulation of the effective non-linearity in the case of direct Al patterning after uniform etching (without periodic etching) is due to the modulation of the electric field during poling.

By contrast, in the present embodiment where Al patterning is performed after periodic etching, an improved modulation of the effective non-linearity is provided because spreading effects are reduced.

In fact, when periodic etching is performed, Al patterning is not necessary to periodically modulate the non-linearity. After periodic etching, the resist can be removed and Al evaporated over the whole plane face of the D-fibre. A periodic second order non-linear pattern will be created in the core purely by virtue of the varying distance between the waveguiding core and the blanket surface electrode that will follow the profile of the structured surface of the D-shaped fibre. The extent of the non-linearity induced by the thermal poling (described further below) is shown highly schematically in FIG. 4B by the shading which can be seen to extend through the core region where the surface and thus the anode electrode is closer to the core region, but not to extend to the core region where the surface and thus the anode electrode is farther from the core region.

The reason lies in the aforesaid change in the effective non-linearity, and is attributable to the fact that the non-linear layer can be 5–20 μm thick under the anodic electrode, following the surface profile. A careful design of the fibre geometry therefore provides periodic longitudinal alternance of poled and weakly poled core segments. Effectively the overlap integral between the interacting modes and the non-linear layer is periodically varied to provide the desired quasi-phase-matching condition.

Avoiding an Al or metal pattern by using a continuous, blanket electrode could also help to reduce the fringe effects at the electrodes edges which lead to high electric field points with consequent enhanced breakdown probability and damage of the electrode. According to our findings, in the case of directly patterned Al electrodes, the use of rounded corners for the electrode structure, significantly decreases the occurrence of electrical breakdown, improving the reliability of the poling process. However, use of an unpatterned electrode, which is only possible as a result of the structured surface, avoids the problem altogether.

Figure 5:
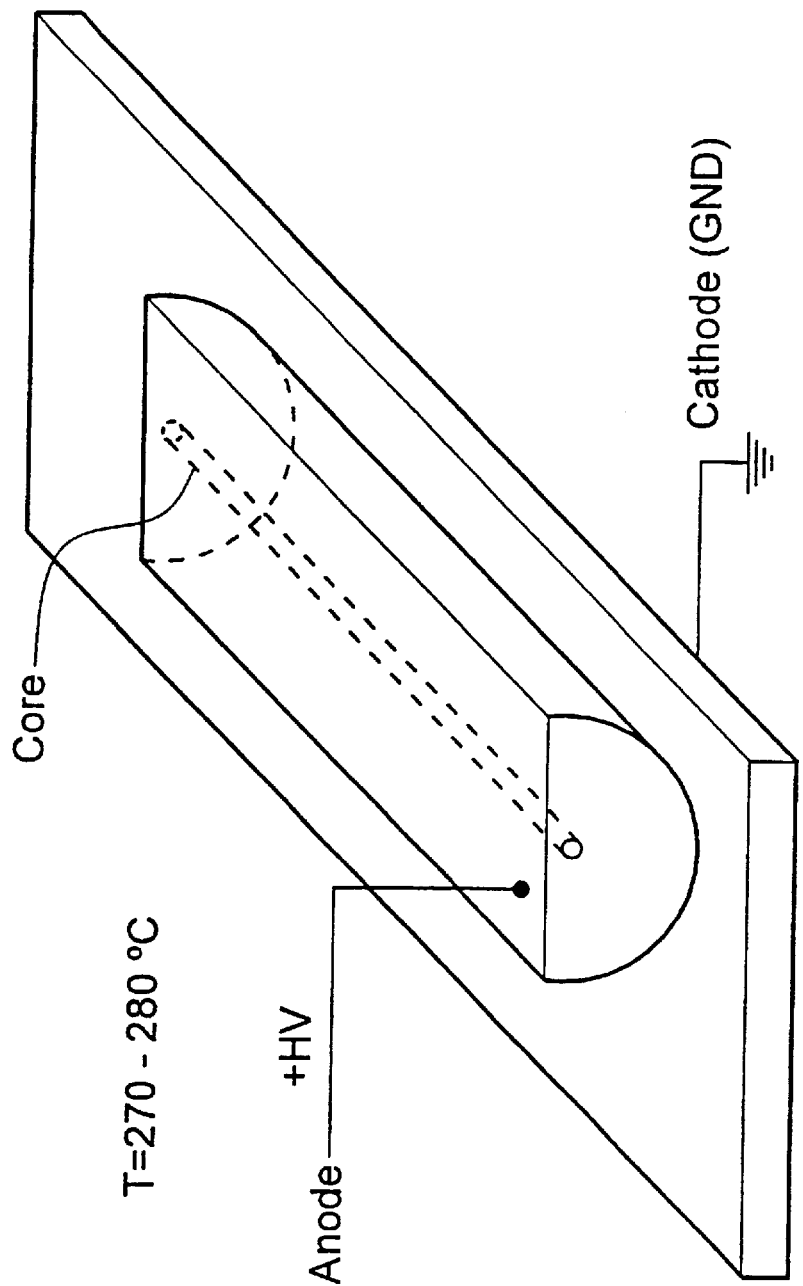
FIG. 5 Poling under vacuum of D-fibre. The anode (positive) is the flat surface electrode and a Si wafer is the cathode (grounded), placed under the curved face. During thermal poling the sample is subjected to 3–5 kV at around 270–280° C.

FIG. 5 shows the next step in the method. Namely, the structured fibre is placed in a high vacuum chamber for PTP. PTP is performed by applying 3–5 kV voltage at 270–280° C. for 10–20 minutes. The Al surface electrode was the positive electrode during poling (anode) while a silicon wafer placed under the curved face was used as the grounded electrode (cathode). The vacuum atmosphere reduces the probability of breakdown, which would certainly occur in air when these voltages are used over such a small electrodes gap.

Figure 6:
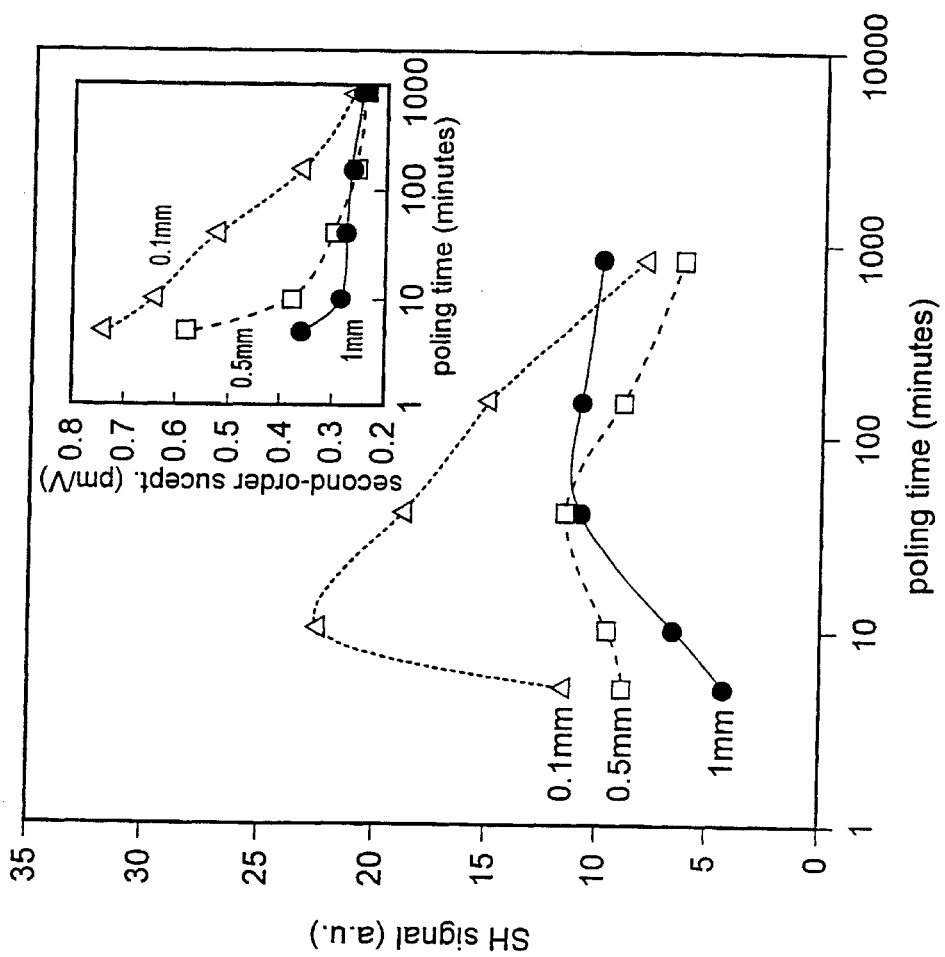
FIG. 6 Second harmonic (SH) signal from thermally poled samples versus poling time for three different sample thicknesses. Poling conditions (4 kV, 290° C.). Inset: non-linear susceptibility against poling time.

FIG. 6 shows a study of thermal poling used to optimise the PTP process. The results show SH signal (and the value of the non-linear susceptibility in the inset) as a function of thermal poling time, obtained using a Q-switched and mode-locked Nd:YAG laser, for fused silica samples after thermal poling in air for different sample thickness. The smaller the samples thickness the higher the value of the non-linearity, a clear indication that part of the voltage during the thermal poling process drops across the undepleted (not poled) sample region. It seems convenient to reduce the electrodes distance during poling, so that the non-linearity is increased. However it has to be pointed out that to form an efficient depletion layer (where most of the voltage drops and is stored in the material when the sample is cooled down to room temperatures) is necessary to have a material thickness (hence the electrode distance) greater than the depletion layer thickness. For example in vacuum the depletion layer thickness (which corresponds to the thickness of the non-linearity) is already ~10–20 μm even for short poling times [15], therefore the electrode distance in any fibre and waveguide structure for thermal poling in vacuum should probably be in the range of 50–100 μm for the temperature and voltage conditions used in these studies. The optimum material thickness for thermal poling is also likely to be dependent on material composition (for example the germanosilicate fibre is made of layers with different proportion of $GeO_2$ and $SiO_2$) and poling conditions (atmosphere, poling temperature and voltage, etc.). For example for thermal poling in air atmosphere the minimum material thickness (electrode distance) could be smaller that that required for thermal poling in vacuum given the fact that the evolution of the depletion layer in air is slower [12]. These results show that the distance between the electrodes (anode and cathode), i.e. the thickness of the material subjected to the poling process, is an important parameter for the thermal poling process which needs careful consideration.

Figure 7:
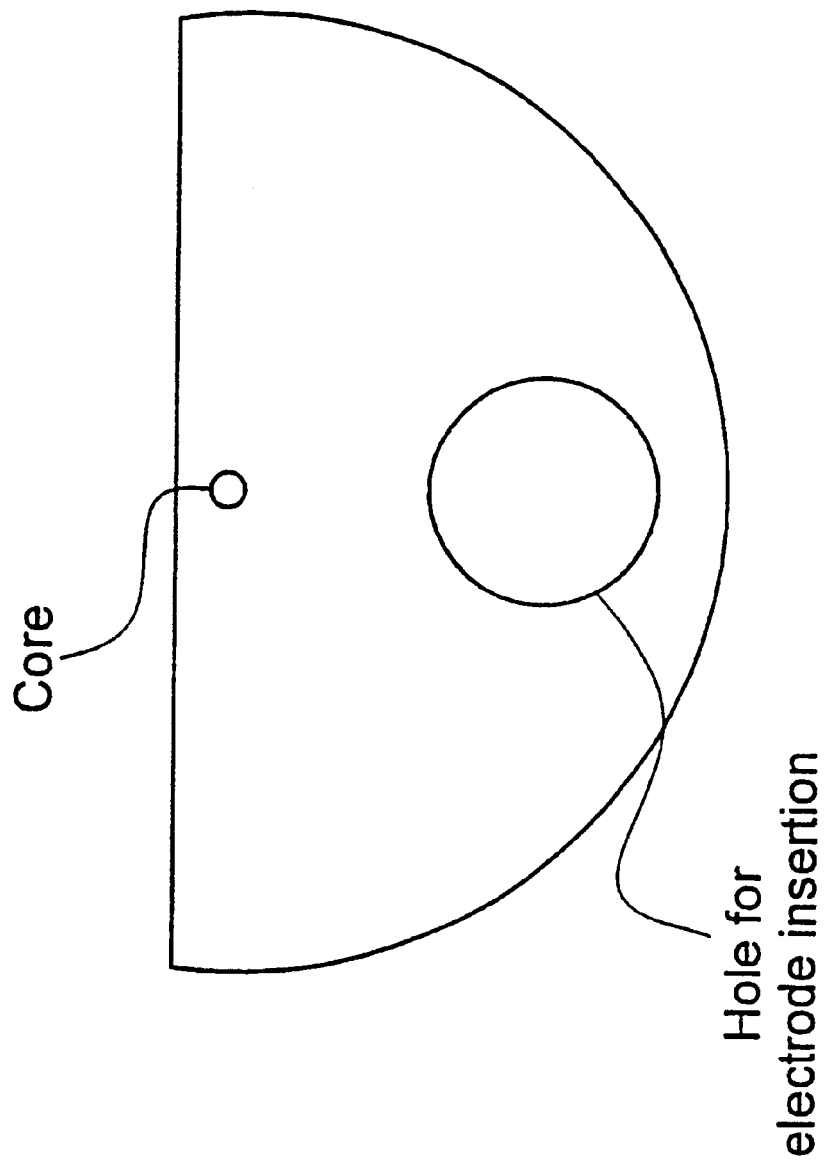
FIG. 7 D-fibre transverse section with internal hole for metal wire insertion.

FIG. 7 shows in cross-section a different fibre geometry for thermal poling, alternative to that of FIG. 5. In this alternative geometry, the D-shaped fibre is provided with a hole for electrode insertion placed along the two-fold symmetry axis of the D-shaped fibre between the core and the curved surface of the "D". A metal wire of gold, Au, plated tungsten, W, is inserted into the hole of the fibre and is used as the cathode during thermal poling. The anode electrode is fabricated on the flat surface of the "D" as described above. In this way electrical breakdown problems during thermal poling are avoided without needing to provide a high vacuum atmosphere. By contrast, when a planar 'pressed contact' cathode is used in contact with the round face of the D-fibre (see FIG. 5), breakdown can only be avoided by thermal poling in high vacuum. The embedded electrode structure reduces effectively the breakdown probability because any conductive path between the two electrodes has to be mainly through the bulk of the material. The thermal poling of this type of fibre has a much higher reliability. For example higher voltages can be applied without encountering breakdown problems. The fibre has been tested for SH generation (SHG) and produced promising results. In principle this fibre could be poled in air, however, according to our studies, the vacuum atmosphere is necessary in order to avoid spreading of the poled sections, at least if a patterned electrode is used, thus maintaining a deep modulation of the non-linearity.

Figure 8:
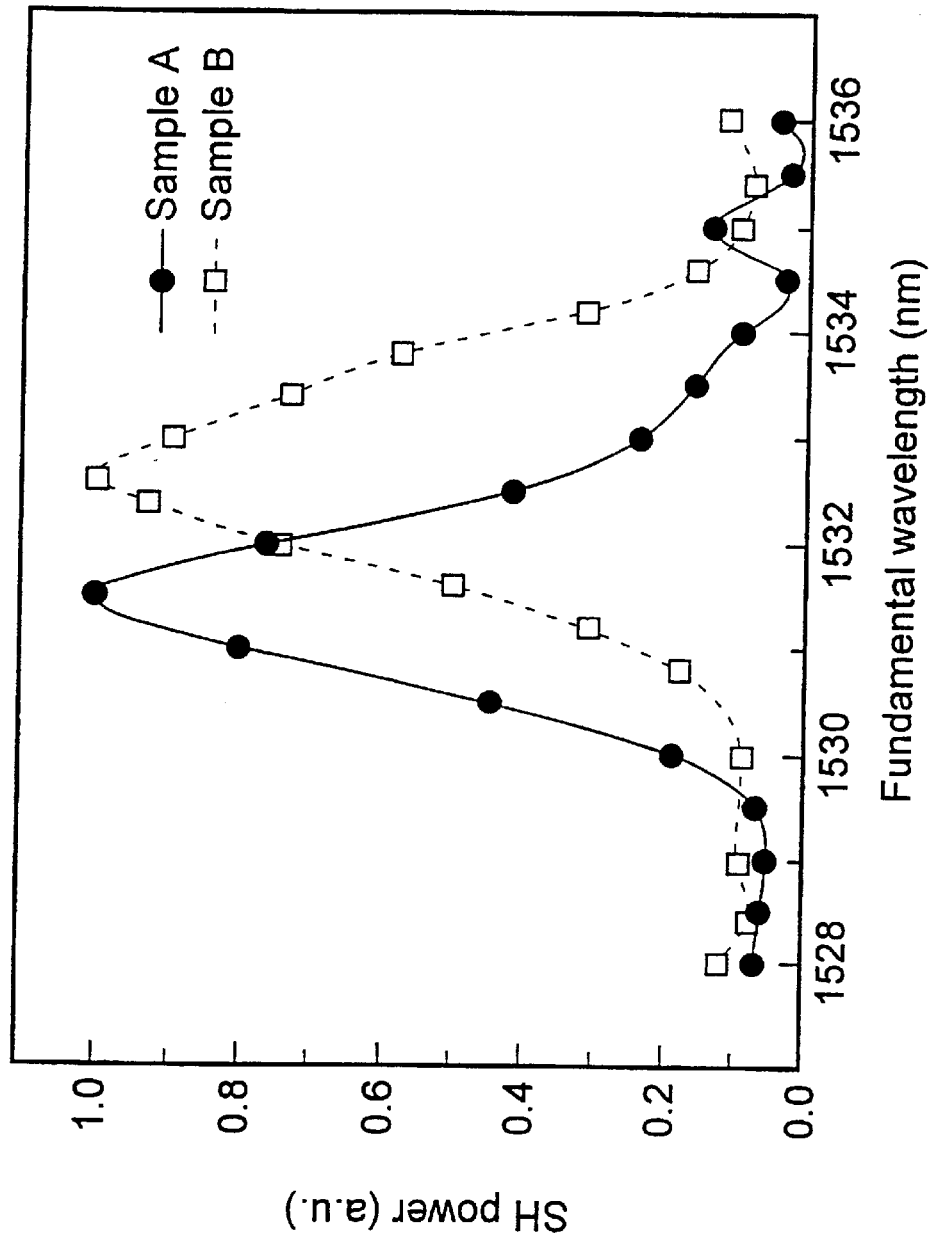
FIG. 8 Example of quasi-phase-matching curves (second harmonic power as a function of fundamental wavelength) for two different gratings: Sample A (period of 56.45 $\mu$m and length of 75 mm) and Sample B (period of 56.5 $\mu$m and length of 60 mm). The numerical aperture and the core radius of the fibre are 0.191 and 3 $\mu$m respectively. The bandwidths compare well with the theoretical values for uniform gratings with the same length.

FIG. 8 shows results of second harmonic generation (SHG). Examples are shown of quasi-phase-matching curves (second harmonic power as a function of fundamental wavelength) for two different gratings: Sample A (period of 56.45 μm and length of 75 mm) and Sample B (period of 56.5 μm and length of 60 mm). The numerical aperture and the core radius of the fibres are 0.191 and 3 μm respectively.

The results were taken to assess the quality of the waveguide structures and used a high power tuneable Er-doped fibre amplifier source in the low power regime to avoid saturation and higher order non-linear effects. Typical QPM curves (SH power versus fundamental wavelength) are shown in the figure for Sample A and Sample B. The bandwidths of the QPM curves compare favourably with the expected values for perfect gratings of the same length, thus indicating that the whole grating length is contributing to the non-linear interaction. From the value of the second harmonic efficiency it is possible to estimate the non-linear coefficient [9].

Figure 9:
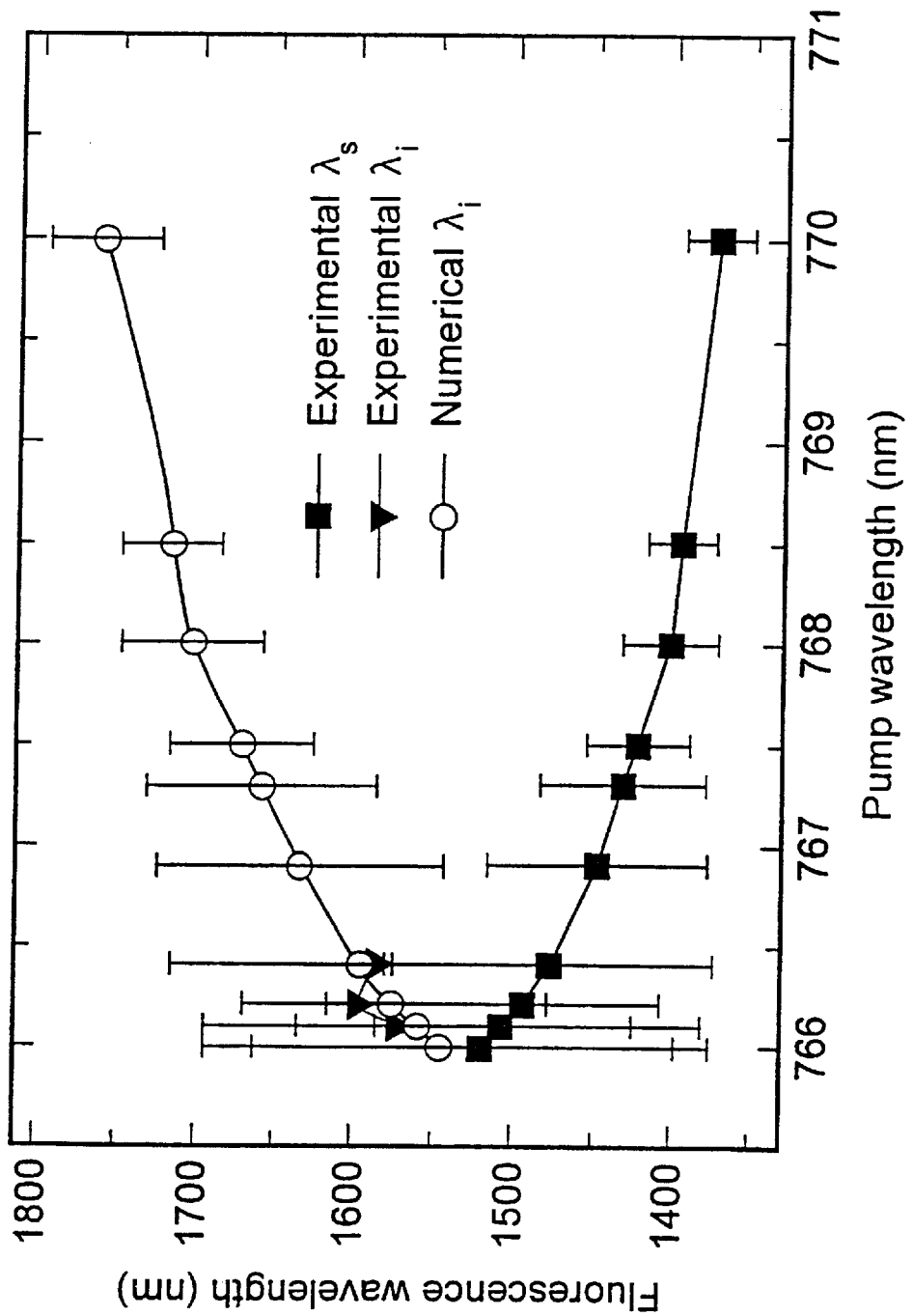
FIG. 9 QPM curve for parametric fluorescence experiment in sample B. The bars indicate the bandwidth of the generated fluorescence.

FIG. 9 shows a QPM curve for parametric fluorescence experiment in Sample B. The bars indicate the bandwidth of the generated fluorescence. Parametric fluorescence at around 1.5 μm was produced by pumping with 300 mW from a continuous wave Ti:Sapphire laser (lasing wavelength=766 nm). A photon production rate of ~150 MHz and a gain bandwidth ~100 nm were achieved. The figure shows the signal and idler wavelength against pump wavelength for the parametric fluorescence experiment.

Some device design considerations are now discussed. Typically the grating periods required to phase-match the second-order parametric interactions are in the range of tens of microns for forward interactions. This, very importantly, enables one to use the surface structuring technique with standard relatively large feature size processing techniques.

Some devices using PTP structures fabricated according to the above described methods are now described.

Figure 10A:
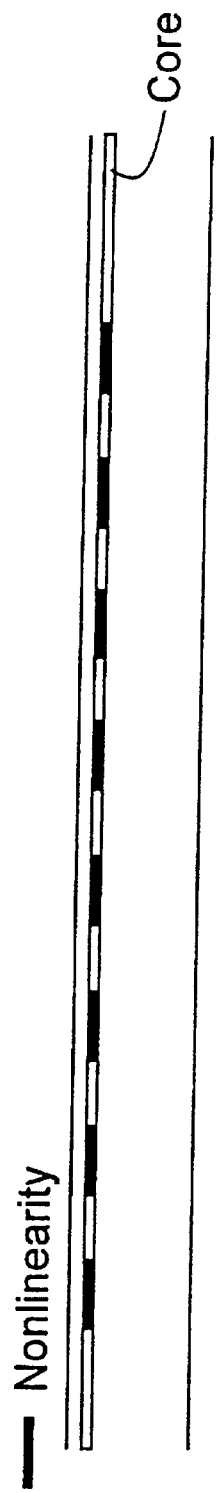
FIG. 10A Longitudinal section through a forward-interaction three-wave-mixing device.
Figure 10B:
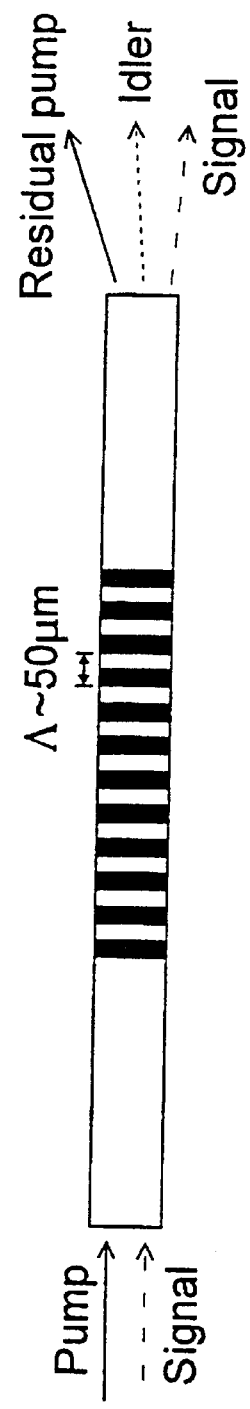
FIG. 10B Schematic of the device of FIG. 10A showing the second order non-linearity modulation and the light signals.

FIG. 10A and FIG. 10B show a Forward-Three-Wave-Mixing (FTWM) fibre device. The illustrated FTWM device provides a transparent and effective frequency converter, which would be largely employed in WDM optical telecommunication systems.

The pump beam interacting with the non-linear fibre and with the incoming signal, produces a forward travelling idler which carries the same modulation as the signal at a different wavelength such that:

$$\omega_i + \omega_s = \omega_p \tag{1}$$

where $\omega_i$, $\omega_s$, $\omega_p$ denote idler, signal and pump frequency respectively. At the same time the signal wave is also amplified. The phase-matching condition is provided by the use of a periodic non-linearity achieved in the core by means of the above-described PTP methods. The advantage of FTWM consists in the use of non-linear gratings possessing a period of tens of microns, however due to the co-propagating nature of the waves involved, optical filtering is necessary to separate idler from signal and to suppress the residual pump signal.

Figure 11A:
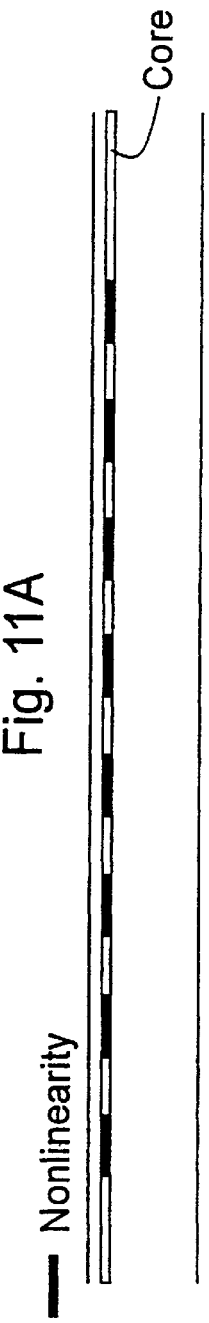
FIG. 11A Longitudinal section through a forward-interaction optical parametric oscillator device.
Figure 11B:
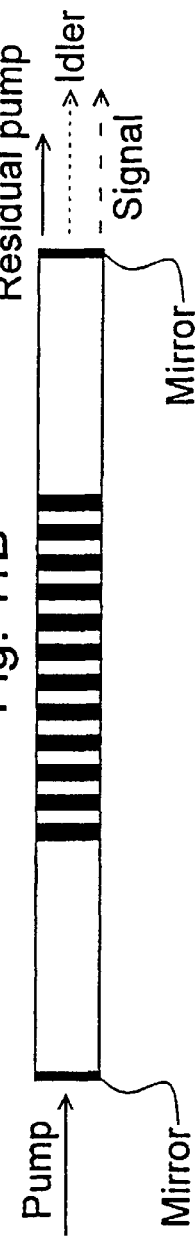
FIG. 11B Schematic of the device of FIG. 11A showing the second order non-linearity modulation and the light signals.

FIG. 11A and FIG. 11B show another device, namely an optical parametric oscillator. FTWM can be used to implement optical parametric oscillators (OPOs). However suitable optical feedback must be provided by means of mirrors that can be external or directly fabricated onto the polished ends of the non-linear fibre. OPOs find large use as sources of coherent radiation possessing a very broad tuneability range, which find useful application for example in spectroscopy, material and laser science.

Figure 12A:
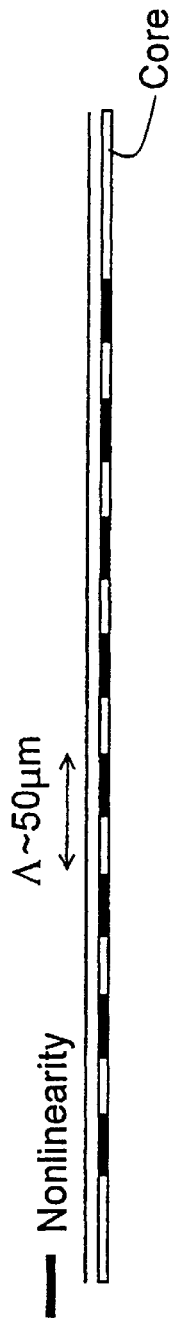
FIG. 12A Longitudinal section through a forward-interaction photon pair generator device.
Figure 12B:
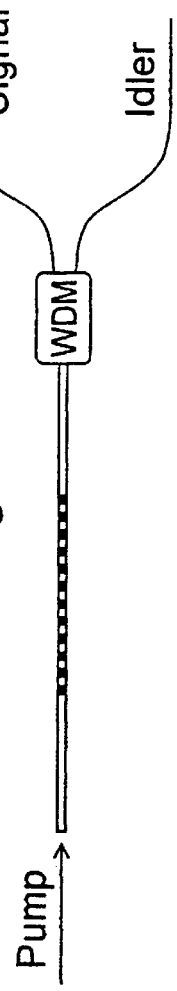
FIG. 12B Schematic of the device of FIG. 12A showing the second order non-linearity modulation and the light signals and wavelength division multiplexer (WDM) coupler.
Figure 13A:
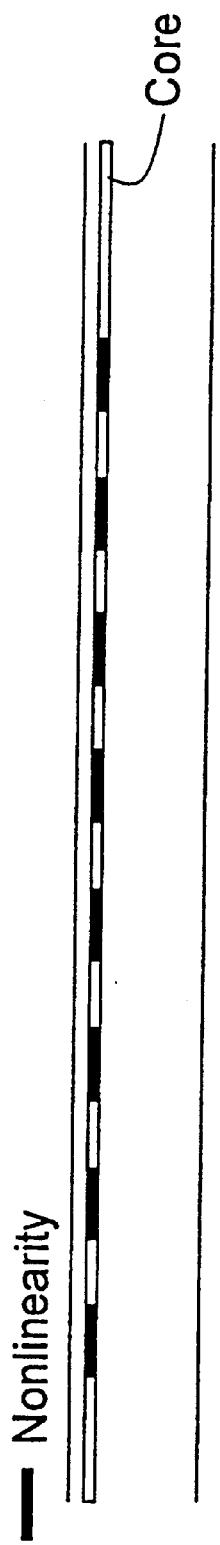
FIG. 13A Longitudinal section through a forward-interaction second harmonic generator device.
Figure 13B:
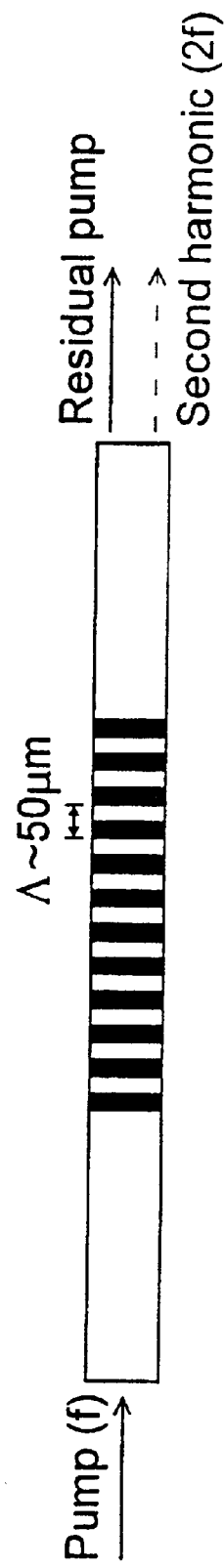
FIG. 13B Schematic of the device of FIG. 13A showing the second order non-linearity modulation and the light signals.

FIG. 12A and FIG. 12B show another device. This device is a photon-pair generator based around a fibre possessing periodic second-order non-linearity is a particular case of TWM. Here a forward configuration is considered. The pump enters the fibre device and interacting with the non-linear medium provides amplification for the photons originated by quantum noise. Each pump photon is then split into two photons, according to equation (1) above. The two photons represent a pair and possess special correlation properties, which exhibit non-local behaviour. This can be exploited for example in fibre-based quantum key distribution system where the photon pair generator would represent the light source FIG. 13A and FIG. 13B show another device, namely a second harmonic generator. This device is another case of TWM (here considered forward). The pump beam at frequency $f$ self-beats to produce a second harmonic beam at frequency $2f$. SH generation is useful to generate new wavelengths by doubling the output of readily available powerful lasers, in particular fibre lasers. A fibre second harmonic generator would be straightforward to integrate with existing high power fibre lasers/amplifiers, by means of direct splicing or micro-optics coupling.

Figure 14:
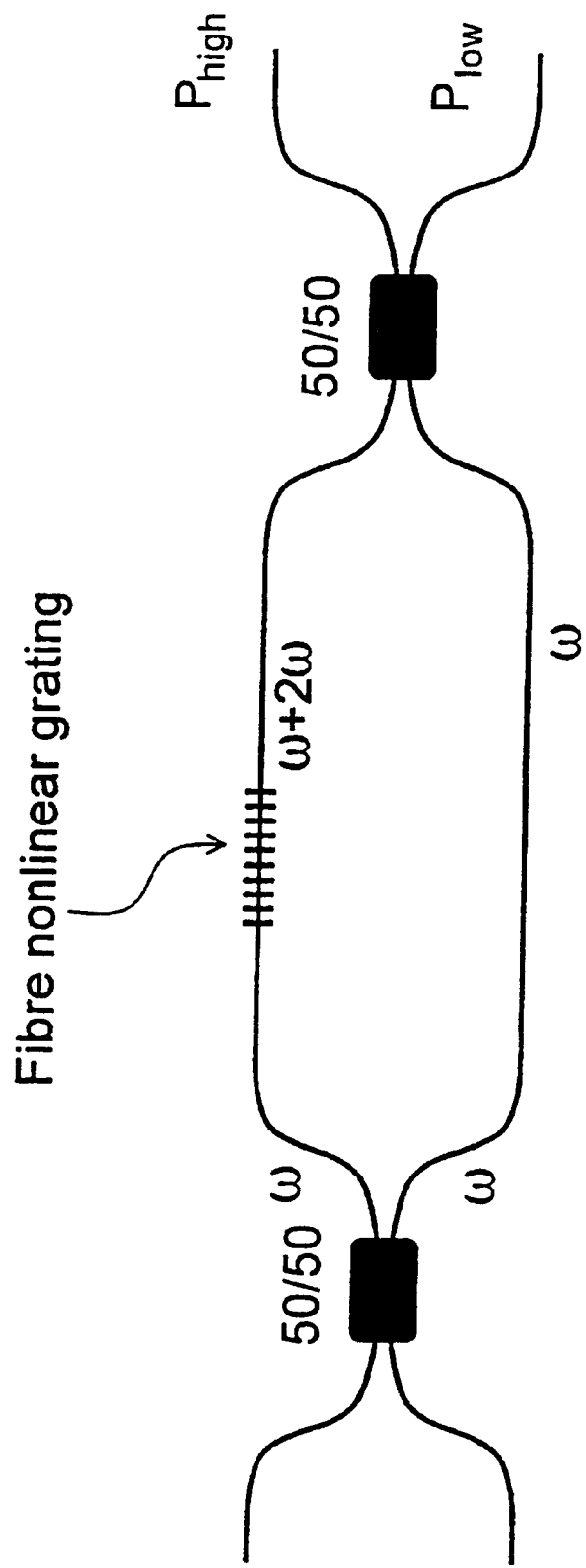
FIG. 14 Schematic of a power dependent switch device.

FIG. 14 shows another device which is a power dependent optical switch. In this device the non-linearity is cascaded, by which it is meant the pump at frequency $\omega$ is frequency doubled and then converted back to $\omega$. In this process, the pump wave acquires a phase shift, which is power dependent and that can be used in combination with an interferometer, e.g. Mach-Zehnder, in order to implement a power dependent switch. If the power is high the signal will exit port $P_{high}$, otherwise $P_{low}$. An optical fibre possessing periodic second order non-linearity would allow the implementation of a filly fiberised version of such a device, thus improving its integratability with existing fibre optics networks.

REFERENCES

1. J. A. Armstrong, N. Bloembergen, J. Ducuing, and P. S. Pershan, 'Interactions between light waves in a non-linear dielectric', Physical Review 127, 1918 (1962)

2. R. A. Myers, N. Mukhexjee, and S. R. J. Brueck, *'Large second-order non-linearity in poled fused silica'*, Optics Lett. 16, 1732 (1991)
3. R. Kashyap, *'Phase-matched periodic electric-field-induced second-harmonic generation in optical fibres'*, J. Opt. Soc. Am. B 6, 313 (1989)
4. R. A. Myers, N. Mukheree, and S. R. J. Brueck, *'Large second-order non-linearity in poled fused silica'*, Optics Lett. 16, 1732 (1991)
5. R. Kashyap, G. J. Veldhuis, D. C. Rogers, and P. F. McKee, *'Phase-Matched second-harmonic generation by periodic poling of fused silica'*, Appl. Phys. Lett. 64, 1332 (1994)
6. P. G. Kazansky, V. Pruneri and P. St. J. Russell, *'Blue-light generation by quasi-phase-matched frequency doubling in thermally poled optical fibres'*, Optics Lett. 20, 843 (1995)
7. V. Pruneri and P. G. Kazansky *'Frequency doubling of picosecond pulses in periodically poled D-shape silica fibre'*, Electronics Lett. 33, 318 (1997)
8. V. Pruneri, G. Bonfrate, P. G. Kazansky, C. Simnonneau, P. Vidakovic, and J. A. Levenson, *'Efficient frequency doubling of 1.5 μm femtosecond laser pulses in quasi-phase-matched optical fibres'*, Applied Phys. Lett. 72, 1007 (1998)
9. V. Pruneri, G. Bonfrate, P. G. Kazansky, D. J. Richardson, N. G. Broderick, C. Simonneau, P. Vidakovic, J. A. Levenson, *'>20%-efficient frequency doubling of 1532 nm nanosecond pulses in quasi-phase-matched germanosilicate optical fibres'*, Optics Lett. 24, 208 (1999)
10. U.S. Pat. No. 5,617,499: S. R. J. Brueck, X. C. Long 'Technique for fabrication of a poled electro-optic fiber segment'
11. M. Scalora et al., *'Pulsed second-harmonic generation in non-linear, one-dimensional, periodic structures'*, Physical Review A 56, 3166 (1997) and J. W. Haus et al., *'Enhanced second-harmonic generation in media with a weak periodicity'*, Physical Review A 57, 2120 (1998)
12. V. Pruneri, F. Samoggia, G. Bonfrate, P. G. Kazansky, and G. M. Yang, Applied Phys. Lett 74, 2423 (1999)

What is claimed is:

1. A method of creating a varying second order non-linearity profile along a waveguide, comprising:
   providing a waveguide structure with a waveguiding core and a surface adjacent to the waveguiding core;
   structuring the surface to produce a structured surface defining a varying distance between the structured surface and the waveguiding core along the waveguide; and
   thermally poling the waveguide structure to generate a non-linear layer under the structured surface of the waveguiding structure and thereby provide a varying second order non-linearity profile along the waveguide derived from the varying distance between the structured surface and the waveguiding core.

2. A method according to claim 1, wherein the thermal poling comprises:
   forming a first electrode on the structured surface and arranging a second electrode so that the waveguiding core lies between the first and second electrodes; and
   applying a voltage between the first and second electrodes while maintaining the waveguide structure at an elevated temperature.

3. A method according to claim 2, wherein the first electrode is continuous along the structured surface of the waveguide structure.

4. A method according to claim 2, wherein the second electrode is embedded within the waveguiding structure.

5. A method according to claim 3, wherein the thermal poling is carried out in non-vacuum.

6. A method according to claim 3, wherein the thermal poling is carried out in air.

7. A method according to claim 1, wherein the surface is a substantially flat surface prior to the structuring.

8. A method according to claim 7, wherein the waveguide structure is a D-shaped optical fibre with the substantially flat surface being formed by the straight upright of the "D".

9. A method according to claim 1, wherein the waveguide structure is a planar waveguide structure.

10. A method according to claim 1, wherein the waveguide structure is an optical fibre.

11. A method according to claim 1, wherein the waveguide structure is formed of glass.

12. A method according to claim 11, wherein the glass is a silicate glass.

13. A method according to claim 12, wherein the silicate glass is germanosilicate.

14. A method according to claim 1, wherein the non-linear layer is 5–20 μm thick.

15. A waveguide fabricated according to the method of claim 1.

16. A waveguide having a varying second order non-linearity profile therealong and a structure adjacent to a core of the waveguide that defines a varying distance between itself and the core, the varying distance corresponding to the varying second order non-linearity profile, wherein the varying second order non-linearity profile is generated by a non-linear layer under the structure of the waveguide.

17. A waveguide according to claim 16, wherein the waveguide is an optical fibre.

18. A waveguide according to claim 16, wherein the waveguide is a planar waveguide.

19. A waveguide according to claim 16, wherein the waveguide is formed of glass.

20. A waveguide according to claim 19, wherein the glass is a silicate glass.

21. A waveguide according to claim 20, wherein the silicate glass is germanosilicate.

22. A waveguide according to claim 16, wherein the non-linear layer is 5–20 μm thick.

23. An optical device utilising three-wave-mixing by quasi phase matching comprising:
   a waveguide having a varying second order non-linearity profile therealong and a structure adjacent to a core of the waveguide that defines a varying distance between itself and the core, the varying distance corresponding to the varying second order non-linearity profile, wherein the varying second order non-linearity profile is generated by a non-linear layer under the structure of the waveguide.

24. An optical device according to claim 23, wherein the three-wave-mixing is forward-interaction three-wave-mixing.

25. An optical parametric oscillator utilising forward-interaction three-wave-interaction mixing by quasi phase matching, comprising:
   a waveguide having a varying second order non-linearity profile therealong and a structure adjacent to a core of the waveguide that defines a varying distance between itself and the core, the varying distance corresponding to the varying second order non-linearity profile, wherein the varying second order non-linearity profile is generated by a non-linear layer under the structure of the waveguide.

26. A photon pair generator utilising forward-interaction three-wave-interaction mixing by quasi phase matching, comprising:

a waveguide having a varying second order non-linearity profile therealong and a structure adjacent to a core of the waveguide that defines a varying distance between itself and the core, the varying distance corresponding to the varying second order non-linearity profile, wherein the varying second order non-linearity profile is generated by a non-linear layer under the structure of the waveguide.

27. A second harmonic generator utilising forward-interaction three-wave-interaction mixing by quasi phase matching, comprising:

a waveguide having a varying second order non-linearity profile therealong and a structure adjacent to a core of the waveguide that defines a varying distance between itself and the core, the varying distance corresponding to the varying second order non-linearity profile, wherein the varying second order non-linearity profile is generated by a non-linear layer under the structure of the waveguide.

28. A power dependent switch utilising forward-interaction three-wave-interaction mixing by quasi phase matching, comprising:

a waveguide having a varying second order non-linearity profile therealong and a structure adjacent to a core of the waveguide that defines a varying distance between itself and the core, the varying distance corresponding to the varying second order non-linearity profile, wherein the varying second order non-linearity profile is generated by a non-linear layer under the structure of the waveguide.

* * * * *